United States Patent [19]

Iacoponi

[11] 4,352,483

[45] Oct. 5, 1982

[54] DIFFERENTIAL THROTTLE OPENING CONTROL MECHANISM

[75] Inventor: Stefano Iacoponi, Turin, Italy

[73] Assignee: Fiat Auto S.p.A., Turin, Italy

[21] Appl. No.: 125,385

[22] Filed: Feb. 28, 1980

[30] Foreign Application Priority Data

Jun. 5, 1979 [IT] Italy ................................ 68205 A/79

[51] Int. Cl.3 ...................... F16K 31/524; F16K 31/53

[52] U.S. Cl. .................................... 251/229; 251/243; 251/250.5; 251/251; 74/513

[58] Field of Search ......................... 74/513, 516, 518; 251/250.5, 251, 243, 229

[56] References Cited

U.S. PATENT DOCUMENTS

| | | | |
|---|---|---|---|
| 1,418,313 | 6/1922 | Long | 74/513 |
| 2,436,897 | 3/1948 | Nutt | 74/516 |
| 3,487,716 | 1/1970 | Hirst, Jr. | 74/516 |
| 3,897,695 | 8/1975 | Rostad | 74/516 |

FOREIGN PATENT DOCUMENTS

| | | | |
|---|---|---|---|
| 872450 | 7/1949 | Fed. Rep. of Germany | 74/516 |

*Primary Examiner*—Kenneth Dorner

*Attorney, Agent, or Firm*—Sughrue, Mion, Zinn, Macpeak and Seas

[57] ABSTRACT

A mechanism for providing differential control of the opening of the throttle valve which controls the amount of air introduced into the induction manifold of an internal combustion engine. The angle of opening of the throttle valve changes with a predetermined law of variation with respect to the displacement of a member controlled directly by the throttle pedal; this member has cam faces formed thereon for successive engagement by different rollers spaced along a transmission member the angular displacement of which is directly related to the angular displacement of the throttle valve. Transmission of movement from the transmission member is by means of meshing toothed sectors providing a fixed ratio, or by way of direct connection to the butterfly spindle.

7 Claims, 3 Drawing Figures

DIFFERENTIAL THROTTLE OPENING CONTROL MECHANISM

BACKGROUND OF THE INVENTION

The present invention relates to a control mechanism for providing differential opening of the throttle valve which controls the amount of air introduced into the induction manifold of an internal combustion engine, particularly one having fuel injection. Such a device is of particular value for use in connection with engines which are to be fitted to automobiles, whereby to provide differential control of the air drawn in for mixing with the fuel.

It is known that the variation of the fuel/air mixture from a fuel rich to a lean ratio is important in reducing the atmospheric pollution caused by an internal combustion engine, for which there exist specific international rules, which lay down specific values of the parameters to which internal combustion engines must now conform. These values vary in individual countries.

OBJECTS OF THE INVENTION

A primary object of the invention is to provide a device for use with an internal combustion engine which helps it to conform to these specific values by depleting or reducing, in a predetermined manner, the proportion of fuel in the fuel/air mixture, by varying the rate of flow of air into the induction manifold.

Another object of the invention is to provide a device for achieving the above object, which is particularly efficient in comparison with conventional air control devices, both during normal running of the engine and during running when cold.

A further object of the invention is the realisation of a particularly simple device, which is of easy construction and the assembly of the components of which is simple and can be effected rapidly.

SUMMARY OF THE INVENTION

The above objects of the invention are achieved by means of a differential opening control mechanism for controlling the angular displacement of the throttle valve which determines the air flow in the induction manifold of an internal combustion engine, comprising:

a first pivoted lever having means at the free end thereof for operative connection to linkage means the movement of which is controlled by the accelerator pedal of said engine, means defining first and second cam profiles on said first pivoted lever, a second pivoted lever, first and second cam follower means on said second pivoted lever, operatively associated with said first and second cam profiles respectively, and movement transmission means operatively connected between said second pivoted lever and said throttle valve, whereby the angular displacement of said valve follows that of said first lever and is related thereto by a relationship determined by the shape of said first and second cam profiles and the transmission ratio of said movement transmission means.

Other characteristics and advantages of the invention will be more clearly understood from a reading of the following specific description of a preferred embodiment, in which reference is made to the attached drawings, provided purely by way of non-limitative example.

DESCRIPTION OF THE PREFERRED EMBODIMENT

Figure 2:
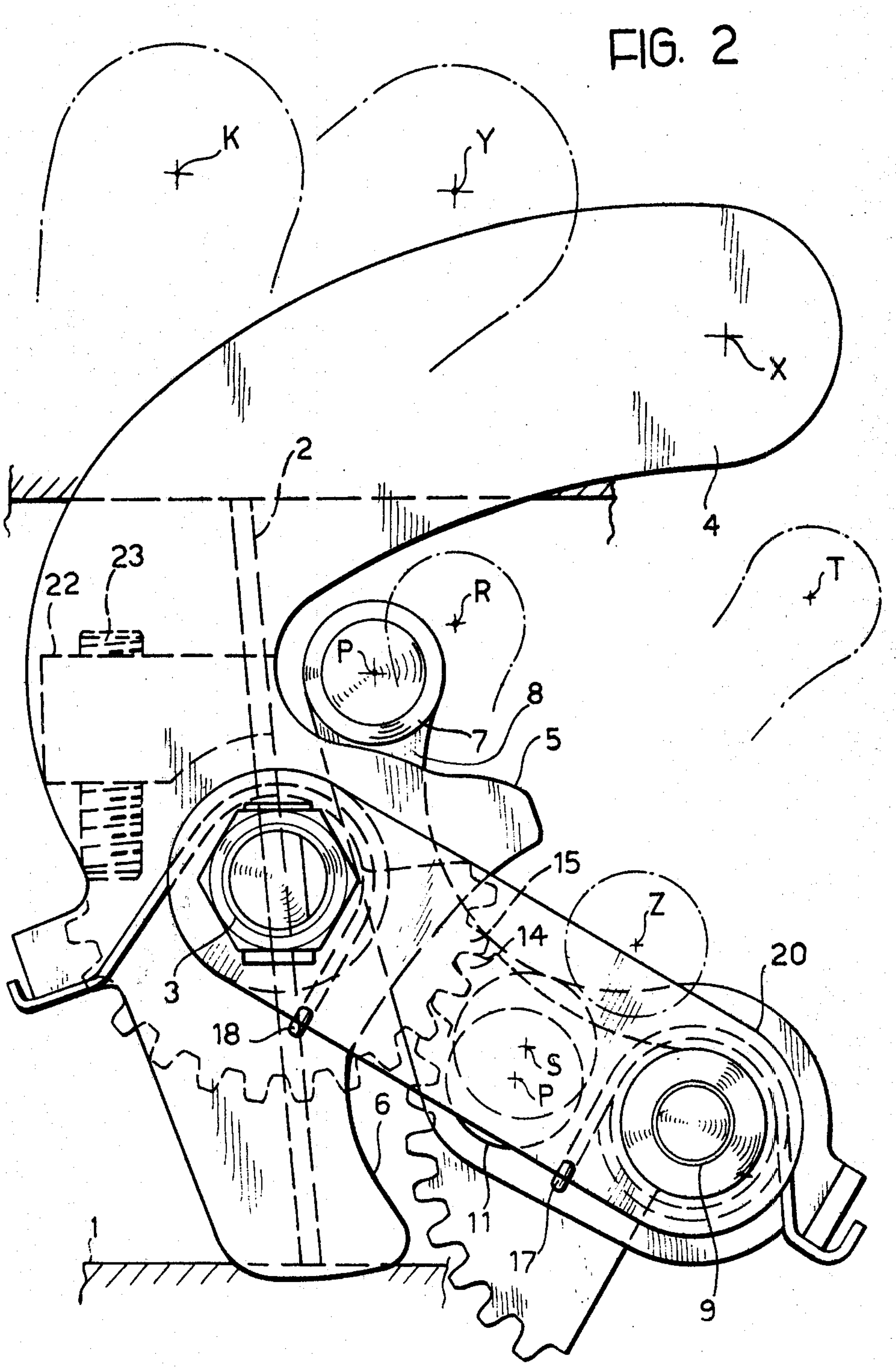
FIG. 2 is an external front view of the novel control device according to the invention.
Figure 3:
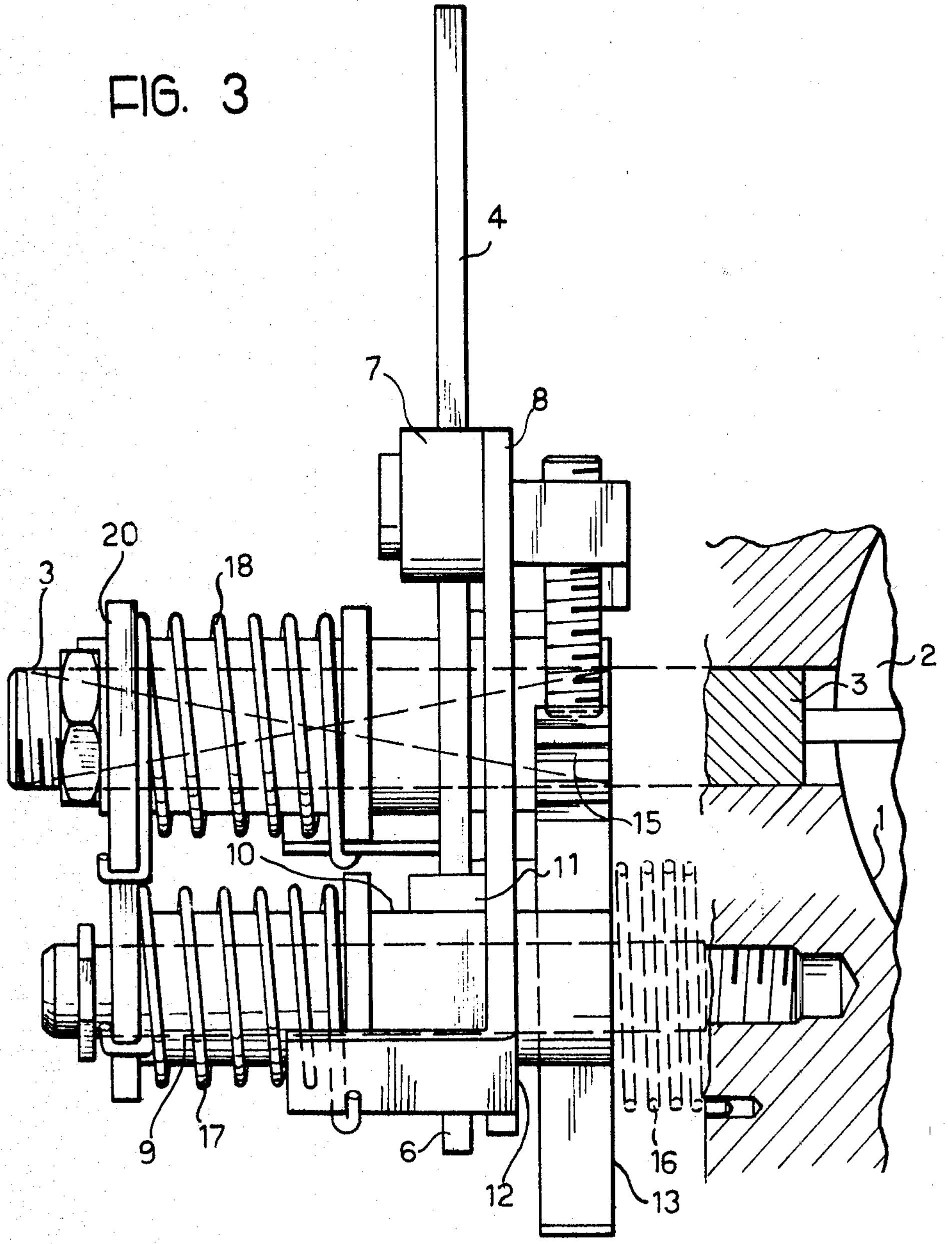
FIG. 3 is a side view of the novel control device illustrated in FIG. 2.

With reference first to FIGS. 2 and 3 of the drawing, there is shown a part of an induction manifold 1 of an internal combustion engine (not shown), within which is located a butterfly throttle valve 2 which controls the air-flow through the manifold 1.

The butterfly valve 2 is fixed on a spindle 3 and turns together with the spindle. A main control lever 4 is freely mounted on the spindle 3 and is operatively controlled by the accelerator pedal of the vehicle by means of a metal cable (not illustrated) which is connected to the free end thereof and which, upon depression of the accelerator pedal, is displaced from the position shown in solid outline in FIG. 2 through a range of positions up to a maximum excursion indicated in broken outline in FIG. 2 and identified with the reference K (the position Y is an intermediate position which will be discussed in further detail below).

The said lever 4 is approximately L-shape and pivoted on the spindle 3 at a point mid-way along one of the arms, which latter incorporates two cam profiles indicated respectively 5 and 6. A cam follower roller 7, carried by a cam follower lever 8, engages the cam profile 5. The lever 8 is connected to a tubular sleeve 10 by welding 12. The sleeve 10 coaxially surrounds a shaft 9 which serves therefore as a pivot for the lever 8. The sleeve 10 also carries a toothed sector 13 secured, by welding onto one end thereof.

The lever 8 also carries another cam follower roller 11, positioned nearer to the pivot 9, which roller 11 is positioned to engage the cam profile 6 of the main control lever 4. The toothed sector 13 meshes with a corresponding toothed sector 15 carried by the butterfly spindle 3 for turning movement therewith.

The free ends of the spindle 3 and the shaft 9 are linked by a link plate 20 against which react respective helical torsion springs, indicated respectively 18 and 17, which serve for biasing the lever 4 and the lever 8 (the latter via the sleeve 10) towards their respective rest positions. A spring 16, mounted on the shaft 9 and engaged at one end in the metal of the manifold 1, biases the sector 14, and thus the butterfly 2 itself, to the rest position.

OPERATION

The device described above operates to control the angle of opening of the butterfly 2 within the manifold to follow a predetermined law of variation. The accelerator pedal cable is directly connected to the free end of the lever 4 so that this moves in direct proportion to the displacement of the accelerator pedal.

By displacing the lever 4 from the point indicated X in FIG. 2 to the point indicated Y in that Figure the said lever 4, which turns freely on the shaft 3, draws the lever 8, mounted on the shaft 9, by the engagement of the cam follower roller 7 with the cam profile 5 from the position indicated P to the position R; the relationship between the displacement of the lever 4 and that of the lever 8 is determined by the particular progression provided by the cam profile 5. At this point, the cam profile 6 enters into contact with the roller 11 which is also mounted on the lever 8, which roller has been moved from the point indicated P, to the point S by the movement described above. Further movement of the lever 4 draws the roller 11 to the point Z with a law of progression determined by the cam profile 6.

The movement of the lever 8 is directly transmitted to the toothed sector 13 the teeth 14, of which mesh with the teeth of the further toothed sector 15 which is mounted on the butterfly spindle 3. The ratio between the teeth of the two sectors 13, 15 further determines the relationship between the angle of opening of the butterfly 2 and the angular displacement of the main control lever 4.

Figure 1:
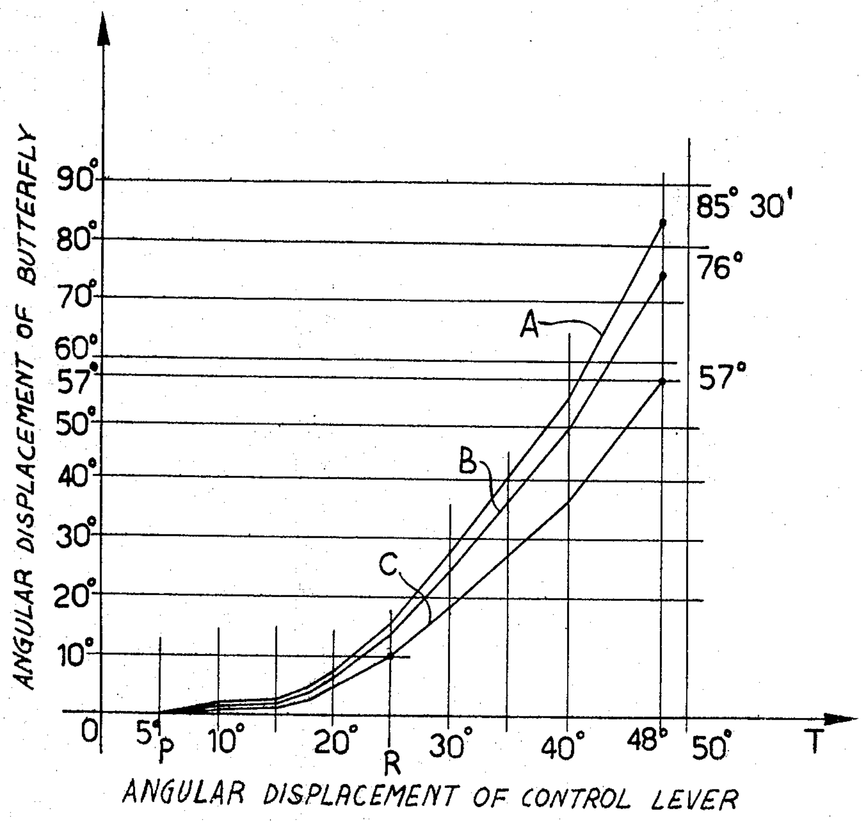
FIG. 1 is a diagram showing the relationship between the angular displacement of a control member and the angular displacement of a throttle valve mounted in the induction manifold.

In fact, as is illustrated in the diagram of FIG. 1, along the abscissa axis of which is plotted the angular displacement of the lever 8, and along the ordinate axis of which is plotted displacement of the butterfly 2, if the transmission ratio of the sectors 13, 15 is 1.5:1 (line A of FIG. 1) there is obtained a maximum opening of the butterfly of 85°30′ for a given maximum angular displacement of the main control lever 4 of 48° and, more importantly, the relation between movement of the control lever 4 and the butterfly 2 at partial openings of the latter is non-linear. Therefore, an appropriate increase in the quantity of air admitted into the mixture of fuel is obtained. If the transmission ratio of sectors 13, 15 is 1.33:1 the variation obtained is as shown by line B of FIG. 2, with a maximum butterfly opening of 76°.

As far as the line C on FIG. 1 is concerned, this corresponds to arranging the system to operate with a transmission ratio of 1:1; for this the sectors 13, 15 may be identical, or alternatively the butterfly 2 mounted directly on the shaft 9, omitting the toothed transmission sectors 13 and 15 from the mechanism. In such an arrangement the movement of the butterfly 2 is identical to that of the lever 8, and the maximum butterfly opening angle is 57°.

The return of the levers 4 and 8, and the butterfly 2 to the rest position of the mechanism is ensured by the three return springs 16, 17 and 18. In particular, the spring 18 mounted on the shaft 3 biases the lever 4 to its rest position, being hooked onto this lever 4 and onto the link plate 20 which connects the shaft 3 and the shaft 9. The spring 17 biases the lever 8 and thus the toothed sector 13, which, as already mentioned is fixed thereto.

This spring 17 is mounted on the shaft 9, and biases the lever 8 to which it is hooked, by reacting on the plate 20. It is assisted by the spring 16 mounted on the shaft 9 which directly biases the toothed sector 13 and reacts against the manifold 1.

The device described above is completed by the block 22 having a screw 23 therein which engages an abutment face on the toothed sector 15. The adjustment of the screw 23, provides for the known "slow running" adjustment.

Having now particularly ascertained and described the nature of the invention, the embodiment described herein purely by way of non-limitative example can be widely modified and adapted by those skilled in the art without by this departing from the spirit and scope of the present invention as defined in the following claims.

What is claimed is:

1. A differential opening control mechanism for controlling the angular displacement of a throttle valve which determines the air flow in an induction manifold of an internal combustion engine, comprising:
   - a spindle connected to said throttle valve for pivotally supporting said throttle valve,
   - a first lever pivoted on said spindle intermediate the ends thereof and adapted to be connected to one end thereof to linkage means the movement of which is controlled by an accelerator pedal of said engine, means defining first and second cam profiles on said first pivoted lever,
   - a support shaft disposed in spaced parallel relation to said spindle,
   - a second lever pivoted on said support shaft,
   - first and second cam follower means on said second pivoted lever, operatively associated with said first and second cam profiles respectively, and
   - movement transmission means operatively connected between said second pivoted lever and said throttle valve whereby the angular displacement of said valve follows that of said first lever and is related thereto by a relationship determined by the shape of said first and second cam profiles and the transmission ratio of said movement transmission means.

2. The differential opening control mechanism of claim 1, wherein said cam follower means are first and second rollers mounted on said second lever.

3. The differential opening control mechanism of claim 1, wherein said movement transmission means comprises said first first toothed sector mounted on a spindle which carries said throttle valve, and a second toothed sector rigidly connected to said second lever for turning movement therewith.

4. The differential opening control mechanism of claim 3, wherein said second toothed sector is mounted on a tubular sleeve which concentrically surrounds said first support shaft constituting the pivot for said second lever, and
   - said second lever is rigidly connected to said tubular sleeve 5. The differential opening control mechanism of claim 4, wherein first resilient biasing means are provided for urging said first lever to its rest position.

6. The differential control mechanism of claim 5, wherein second resilient biasing means are provided for urging said second lever to its rest position.

7. The differential control mechanism of claim 6, wherein third resilient biasing means are provided for urging said second toothed sector to its rest position.

* * * * *